(12) United States Patent
Trinh

(10) Patent No.: US 12,030,661 B2
(45) Date of Patent: Jul. 9, 2024

(54) TRANSMISSION

(71) Applicant: Ningbo Geely Automobile Research & Development Co., Ltd., Ningbo (CN)

(72) Inventor: Freddy Trinh, Gothenburg (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 677 days.

(21) Appl. No.: 17/193,690

(22) Filed: Mar. 5, 2021

(65) Prior Publication Data
US 2021/0188429 A1 Jun. 24, 2021

Related U.S. Application Data

(63) Continuation of application No. PCT/CN2019/104145, filed on Sep. 3, 2019.

(30) Foreign Application Priority Data

Sep. 11, 2018 (EP) .................................... 18193762

(51) Int. Cl.
| | | |
|---|---|---|
| *B64D 35/00* | (2006.01) | |
| *B64C 37/00* | (2006.01) | |
| *F16D 11/00* | (2006.01) | |
| *F16D 11/10* | (2006.01) | |
| *F16D 67/02* | (2006.01) | |

(52) U.S. Cl.
CPC .............. *B64D 35/00* (2013.01); *B64C 37/00* (2013.01); *F16D 11/10* (2013.01); *F16D 67/02* (2013.01); *F16D 2011/002* (2013.01); *F16D 2300/18* (2013.01)

(58) Field of Classification Search
CPC .... F16D 2011/002; F16D 11/10; F16D 11/14; F16D 23/02; F16D 63/006; F16D 67/02–67/06; F16D 2300/18; F16D 2500/10462; F16D 2500/30408; F16H 2061/047; B64C 37/00; B64D 35/00
See application file for complete search history.

(56) References Cited

U.S. PATENT DOCUMENTS

| 2,486,672 A * | 11/1949 | Notestein ............... B64D 35/00 244/65 |
|---|---|---|
| 5,836,541 A | 11/1998 | Pham |
| 2012/0234644 A1 | 9/2012 | Rosemeier |

FOREIGN PATENT DOCUMENTS

| CN | 102398676 A | 4/2012 |
|---|---|---|
| CN | 105121188 A | 12/2015 |
| DE | 102005015161 A1 | 11/2005 |

(Continued)

OTHER PUBLICATIONS

International Search Report from corresponding International Application No. PCT/CN2019/104145, dated Nov. 28, 2019, 2 pages.

*Primary Examiner* — Richard M Lorence
(74) *Attorney, Agent, or Firm* — Tucker Ellis LLP

(57) ABSTRACT

A transmission includes a first component and a second component which are journaled for rotation relative to each other, and a locking mechanism for rotationally locking the first component and the second component relative to each other in a predetermined mutual rotation position. The transmission includes a magnetic field sensor arranged for measuring a relative rotation position of the first component and the second component while the first component and the second component are rotating relative to each other.

20 Claims, 9 Drawing Sheets

(56) References Cited

FOREIGN PATENT DOCUMENTS

| | | |
|---|---|---|
| DE | 102005054595 A1 | 5/2007 |
| DE | 102006056906 A1 | 6/2008 |
| DE | 102013214107 A1 | 1/2015 |
| DE | 102016222540 A1 | 5/2018 |
| GB | 1249289 A | 10/1971 |

* cited by examiner

TRANSMISSION

RELATED APPLICATION DATA

This application is a continuation of International Patent Application No. PCT/CN2019/104145, filed Sep. 3, 2019, which claims the benefit of European Patent Application No. 18193762.4, filed Sep. 11, 2018, the disclosures of which are incorporated herein by reference in their entireties.

TECHNICAL FIELD

The invention relates to a transmission comprising a first component and a second component, which are journaled for rotation relative to each other, and a locking mechanism for rotationally locking the first component and the second component relative to each other in a predetermined mutual rotation position.

BACKGROUND

In some technical fields, a shaft with a propeller may have to be locked against rotation during certain operation conditions. It may be a propeller driven by a motor or a propeller driven by the wind for generating electrical power, for instance.

For example, for a roadable aircraft, such as an aircraft that can be converted into an automotive vehicle capable of driving on a road, the propeller has to be disconnected from the driveline during road driving when the motor drives the wheels. When the propeller is disconnected for road driving, the propeller has to be kept stationary to prevent spinning of the propeller by the wind. Further, for other reasons, such as for reducing the air resistance and achieving balance, the angular position of the propeller will be predetermined, and the propeller will be kept in this specific position in the automotive mode. For a three-bladed propeller where the angular distance between each pair of two adjacent propeller blades is 120°, one propeller blade will usually be kept vertically in an upper position.

A drawback of known locking devices used for locking the propeller during the automotive mode is the addition of components to the transmission making the design more complicated, space-consuming and costly.

SUMMARY

An objective of the invention is to provide a transmission having a lock that can be used for locking a component, such as a propeller, while enabling at least some problem with known locking devices to be reduced or eliminated.

The objective is achieved by a transmission comprising a first component and a second component which are journaled for rotation relative to each other, and a locking mechanism for rotationally locking the first component and the second component relative to each other in a predetermined mutual rotation position, wherein the transmission comprises a magnetic field sensor arranged for measuring a relative rotation position of the first component and the second component while the first component and the second component are rotating relative to each other.

The invention is based on the insight that by such a transmission, locking of a component can be performed with few additional components in a reliable way since the knowledge of the relative rotation position makes it possible to match the engagement of the first component and the second component such that the locked predetermined mutual rotation position can be achieved. Further, the mechanical design of the locking mechanism can be non-complicated. The first component can be a propeller shaft and the second component can be a housing in which the propeller shaft is journaled.

The locking mechanism can comprise a lock unit displaceable in an axial direction for engagement of the first component and the second component. The lock unit can be arranged on the first component. For engagement of the first component and the second component the lock unit is displaced such that the lock unit will engage also the second component.

The lock unit is preferably a sleeve. The sleeve can be provided with internal splines for engagement with the first component and the second component.

For example, the transmission may have at least two modes selectable by the locking mechanism, a first stationary mode where the first component and the second component are locked relative to each other in the predetermined mutual rotation position and a second driving mode where the first component is connected to a drive motor for rotating the first component relative to the second component. Hereby, the lock is integrated in the transmission in a rational way providing a safe lock, since disconnection of the driving mode can be automatically performed when the stationary mode is to be activated by displacement of the lock unit, and vice versa.

It should be stressed that by the expression "predetermined mutual rotation position" is meant a certain position selected for rotationally locking the first component and the second component relative to each other with respect to their respective angular position, as opposed to any random position of a finite number of possible mutual rotation positions.

The number of predetermined mutual rotation positions in which the first component and the second component can be locked relative each other by the locking mechanism can be varied. For some applications there is only one such predetermined mutual rotation position. In other applications a few predetermined mutual rotation positions are possible, and often the number of predetermined mutual rotation positions is in the interval 1-5. For example, for a three-bladed propeller, three predetermined mutual rotation positions can be used since it will be possible to lock the propeller in three equivalent positions giving the same symmetry provided that the angular distance between two adjacent propeller blades is 120°.

According to one embodiment, the lock unit has at least one recess for interacting with a magnetic field generated by the magnetic field sensor, wherein said at least one recess is arranged for indicating a rotation position of one of the first component and the second component. For example, the lock unit can be arranged on the first component and rotationally locked to the first component for rotating together with the first component.

The rotation position of the second component can be fixed and known. Hereby, the rotation position of the first component can be determined and when it is matching the rotation position of the second component, the lock unit can be displaced such that the predetermined mutual rotation position of the first component and the second component is achieved.

According to a further embodiment, said at least one recess is arranged on an outer surface of the lock unit, wherein the depth of the recess varies along a circumferential direction of the lock unit. Hereby, a signal from the magnetic field sensor which signal varies with the recess depth during rotation of the lock unit relative to the magnetic field sensor can be received. For example, by analysing a signal based on the derivative of the magnetic field disturbance, the rotation position of the lock unit can be determined.

According to a further embodiment, the lock unit is provided with at least one magnetized portion for interacting with the magnetic field sensor, said at least one magnetized portion being arranged for indicating the rotation position of one of the first component and the second component. For example, the lock unit can be arranged on the first component and rotationally locked to the first component for rotating together with the first component. The rotation position of the second component can be fixed and known. Hereby, the rotation position of the first component can be determined and when it is matching the rotation position of the second component, the lock unit can be displaced such that the predetermined mutual rotation position of the first component and the second component is achieved.

According to a further embodiment, said at least one magnetized portion is arranged such that the magnetic field of the magnetized portion varies along a circumferential direction of the lock unit. Hereby, a signal from the magnetic field sensor which signal varies with the rotation position of the lock unit during rotation thereof can be received. For example, by analysing a signal based on the magnitude of the magnetic field, the rotation position of the lock unit can be determined.

In addition to measurement of the relative rotation position of the first component and the second component, the magnetic field sensor can be arranged for measuring an axial position of the lock unit and/or a relative rotation speed of the first component and the second component. Hereby, it is possible to further adapt the starting time for displacement of the lock unit and the requisite displacement speed of the lock unit to the current conditions.

A further objective of the invention is to provide a method that can be used for locking a component. This objective is achieved by method for locking a first component and a second component relative to each other in a transmission, wherein the first component and the second component of the transmission are journaled for rotation relative to each other and the transmission comprises a locking mechanism for rotationally locking the first component and the second component relative to each other in a predetermined mutual rotation position, which method comprises the step of measuring a relative rotation position of the first component and the second component by means of a magnetic field sensor while the first component and the second component are rotating relative to each other, and activating the locking mechanism for rotationally locking the first component and the second component relative to each other in the predetermined mutual rotation position based on the relative rotation position measured by means of the magnetic field sensor.

According to another aspect of the invention, a further objective is to provide a roadable aircraft comprising a transmission having a lock that can be used for locking a propeller of the aircraft.

The advantages of the method and the roadable aircraft are substantially the same as the advantages already discussed hereinabove with reference to the different embodiments of the transmission. Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1A:
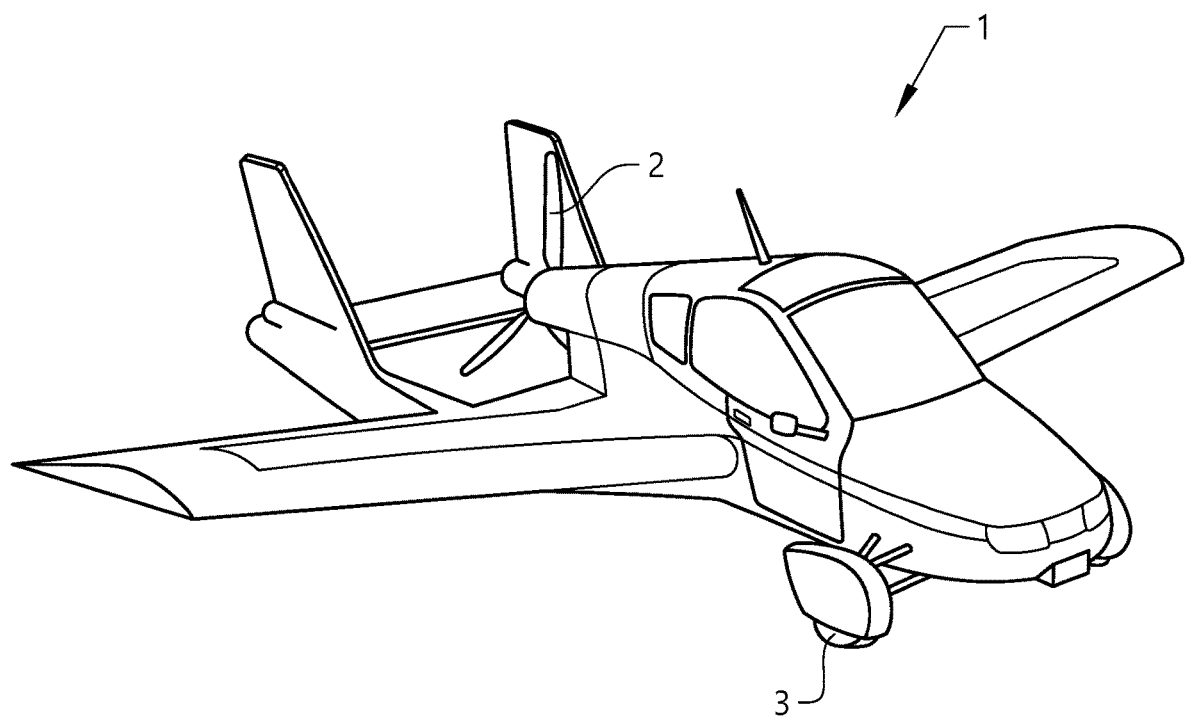
FIG. 1A is a perspective view of a roadable aircraft.
Figure 1B:
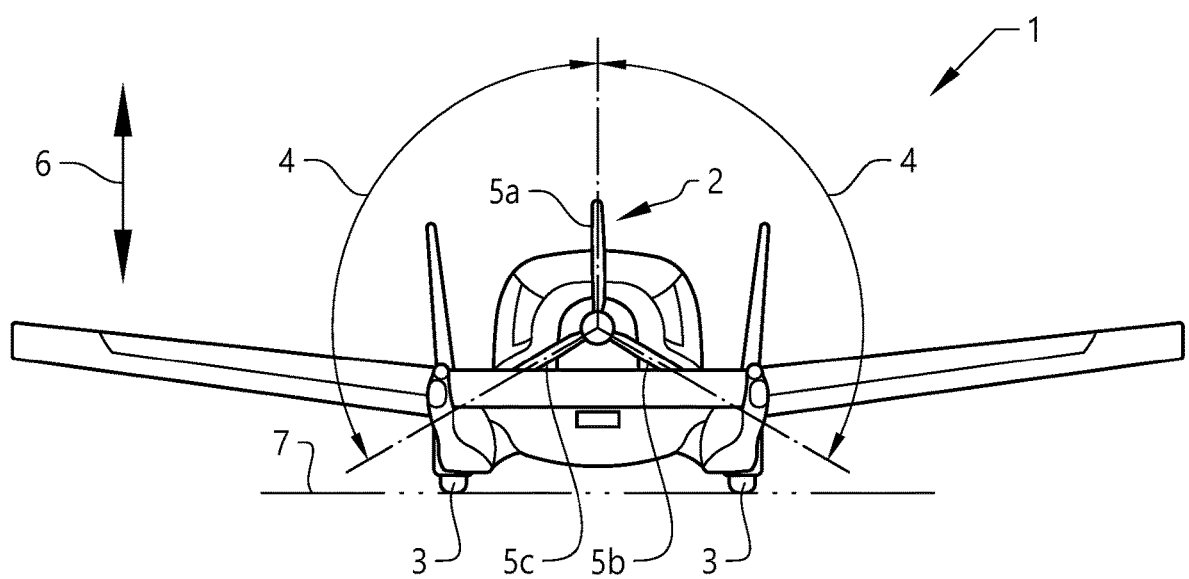
FIG. 1B is a rear view of the roadable aircraft shown in FIG. 1A.

FIGS. 1A and 1B show a roadable aircraft 1. FIG. 1A shows the aircraft 1 in a perspective view and FIG. 1B shows the aircraft 1 in a rear view. The aircraft 1 can be converted into an automotive vehicle capable of driving on a road and interacting with a land-based traffic system. The aircraft 1 is shown when used as an automotive vehicle during road driving. In the automotive mode, the propeller 2 is disconnected from the driveline since the motor is used for driving the wheels 3. When the propeller 2 is disconnected for road driving, the propeller 2 is preferably kept stationary to prevent spinning of the propeller by the wind. For reducing the air resistance and achieving balance, for instance, the propeller 2 will be kept in a specific position in the automotive mode. For a three-bladed propeller 2 as illustrated in FIGS. 1A and 1B, where the angular distance 4 between each pair of propeller blades 5a, 5b; 5b, 5c; 5c, 5a is 120°, one propeller blade 5a will usually be kept vertically in an upper position. Thus, the upper propeller blade 5a is directed in a vertical direction 6, at least as long as the aircraft 1 is standing on a substantially even ground 7, and each of the other propeller blades 5b, 5c is directed obliquely downwards.

The propeller 2 is arranged on a propeller shaft of a transmission of the roadable aircraft 1. The transmission will be described hereinafter with reference to the remaining figures.

Figure 2:
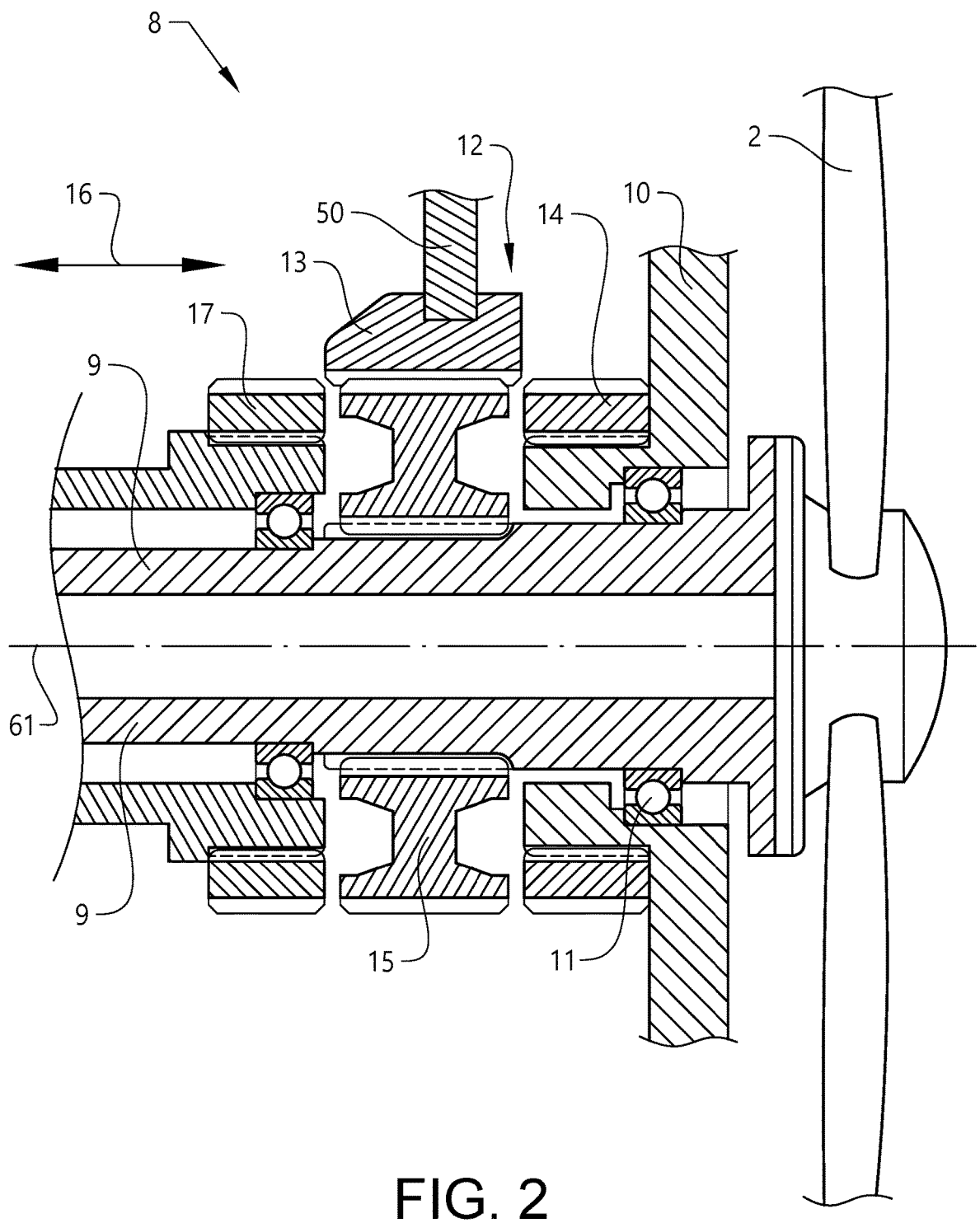
FIG. 2 is a partly cut side view of a transmission in a neutral mode.

FIG. 2 shows the transmission 8 in a partly cut side view. Although the transmission is described herein with reference to a vehicle application, such a transmission could also be used in other applications.

The transmission 8 comprises a first component 9 and a second component 10 which are journaled for rotation relative to each other by a bearing 11. In the example embodiment illustrated in FIG. 2, the first component is a propeller shaft 9 on which the propeller 2 is arranged and the second component is a housing 10 of the transmission 8. The housing 10 constitutes a fixed point on the aircraft 1. The transmission 8 further comprises a locking mechanism 12 for rotationally locking the first component 9 and the second component 10 relative to each other in a predetermined mutual rotation position.

The locking mechanism 12 comprises a lock unit 13. The lock unit 13 could be any suitable means for rotationally locking the first component and the second component to each other. The lock unit 13 is displaceable in an axial direction 16 for engagement of the first component 9 and the second component 10. The lock unit 13 can be arranged on the first component 9. In the example embodiment illustrated in FIG. 2, the lock unit is a sleeve 13 which is arranged on the first component 9. The transmission 8 suitably comprises a hub 15 arranged on the first component on which hub 15 the sleeve 13 is arranged. The hub 15 is fixed relative to the first component 9. The sleeve 13 is rotationally locked to the hub 15 and thereby rotationally locked relative to the first component 9 but is displaceable in the axial direction 16 relative to the hub 15. The hub 15 can have external splines and the sleeve 13 can have internal splines forming a spline joint.

Further, the locking mechanism comprises a dog ring 14 which is rotationally locked to the second component 10. The dog ring 14 is suitably provided with external splines corresponding to the internal splines of the sleeve 13. Thus, the sleeve 13 is rotationally locked relative to the first component 9 and the dog ring 14 is rotationally locked relative to the second component 10, and the sleeve 13 and the dog ring 14 are axially displaceable relative to each other for engagement of the sleeve 13 and the dog ring 14 such that the first component 9 and the second component 10 are rotationally locked relative to each other.

The sleeve 13 and the dog ring 14 should be engaged only in a mutual rotation position corresponding to the predetermined mutual rotation position of the first component 9 and the second component 10. In the example embodiment illustrated in FIG. 2 (and FIGS. 1A and 1B) the predetermined mutual rotation position of the first component 9 and the second component 10 corresponds to a predetermined rotation position of the propeller 2 arranged on the propeller shaft 9. Thus, the propeller 2 is locked relative to the air craft 1 in the way as described hereinabove with reference to FIGS. 1A and 1B.

As examples, the number of predetermined mutual rotation positions of the first component 9 and the second component 10 can be 1 or 3 when using a propeller with three propeller blades. In the first case, it is always the same propeller blade 5a that is directed in the vertical direction 6 when the propeller is locked. However, in the other case, due to the symmetry, the propeller 2 can be locked such that any of the propeller blades 5a, 5b, 5c is directed in the vertical direction 6, since there are three equivalent locking positions for the propeller 2.

The sleeve 13 can be displaceable in the axial direction 16 by means of a shift fork 50 of a gear actuator. The gear actuator is schematically illustrated in FIG. 4A.

The transmission 8 has preferably at least two modes selectable by displacement of the sleeve 13. In the example embodiment illustrated in FIG. 2, the transmission 8 has a first stationary mode where the first component 9 and the second component 10 are locked relative to each other in the predetermined mutual rotation position as previously described hereinabove. In this stationary mode the sleeve is axially displaced (to right in FIG. 2) such that the sleeve 13 and the dog ring 14 are engaged. The transmission 8 has also a second driving mode where the first component is connected to a drive motor (not shown) for rotating the first component 9 relative to the second component 10. In this driving mode the sleeve 13 is axially displaced (to left in FIG. 2) such that the sleeve 13 and a further dog ring 17 are engaged. Finally, the transmission 8 has also a neutral mode where the first component 9 and the second component 10 are not rotationally locked relative to each other and the first component 9 is disconnected from the drive motor. In this neutral mode, the sleeve 13 is arranged in a centre position on the hub 15 not engaging any of the dog rings 14, 17, as illustrated in FIG. 2.

Figure 3:
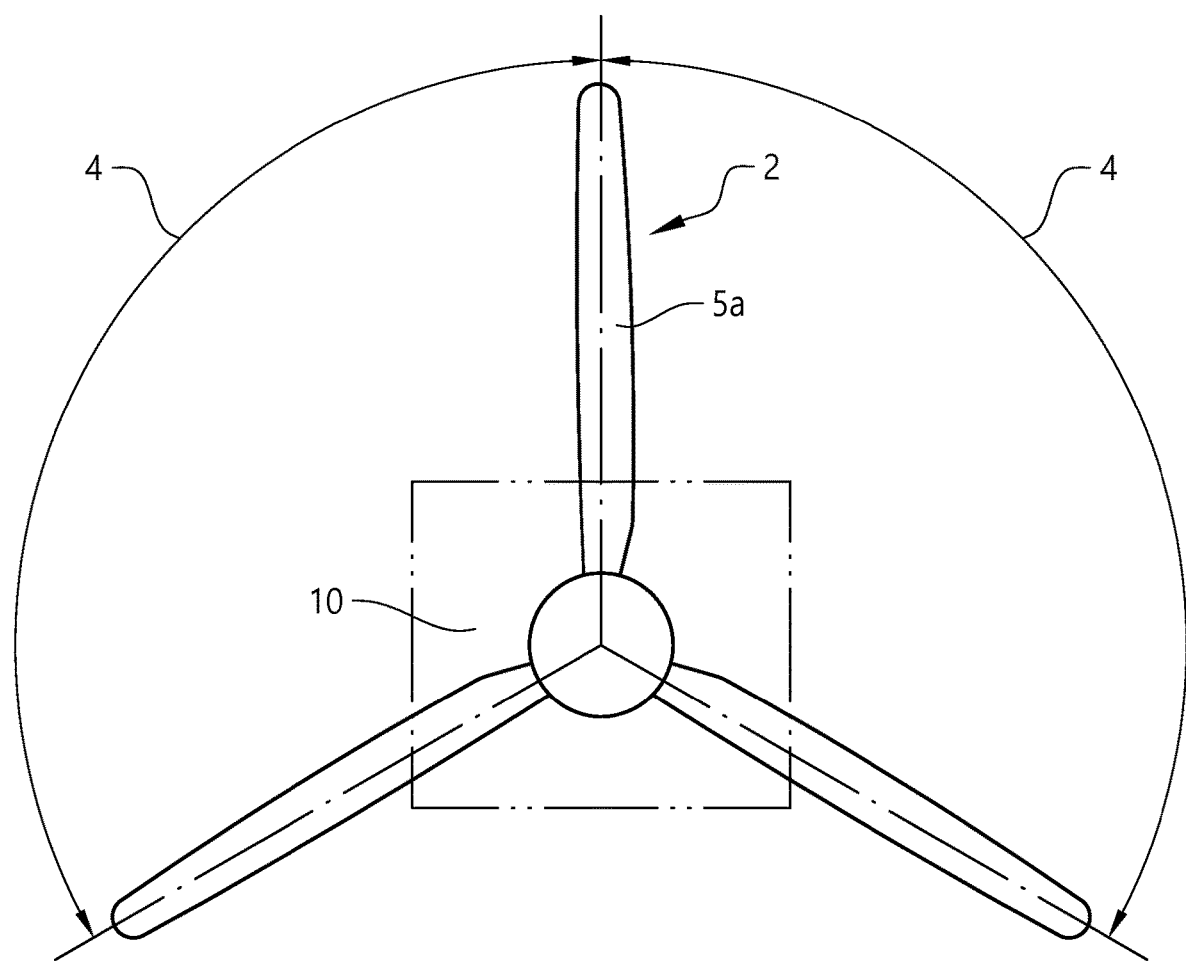
FIG. 3 is an end view of the transmission showing a propeller in a locked state.

FIG. 3 shows the transmission 8 in an end view where the transmission is in the locked mode corresponding to FIG. 1B. The propeller shaft 9 and the propeller 2 are locked relative to the housing 10 in the predetermined mutual rotation position. One blade 5a of the three-bladed propeller 2 is positioned in the vertical direction 6.

Figure 4A:
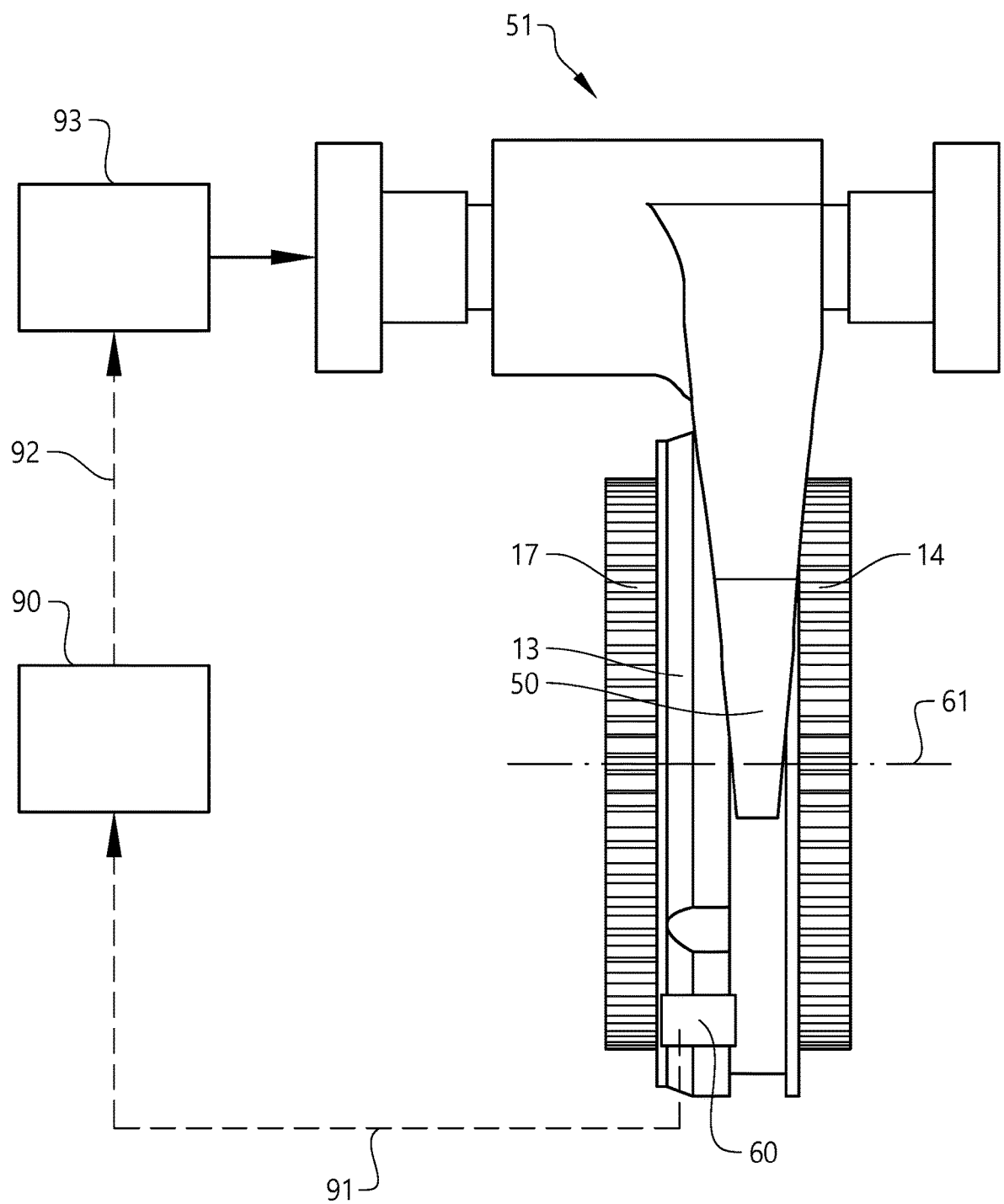
FIG. 4A is a front view of a locking mechanism of the transmission in FIG. 2.

FIG. 4A shows in a front view the sleeve 13, the dog rings 14, 17 and the gear actuator 51 with the shift fork 50. Further, the transmission 8 comprises a magnetic field sensor 60 arranged for measuring a relative rotation position of the first component 9 and the second component 10 while the first component and the second component are rotating relative to each other. In other words; the transmission 8 comprises the magnetic field sensor 60 for measuring a relative angular position of the first component and the second component while at least one of the first component and the second component is rotating about an axis 61. This measurement is performed before displacement of the sleeve 13, optionally after synchronization by means of a synchronizer (not shown), when the first component 9 and the second component 10 are disengaged.

In the example embodiment illustrated in FIG. 2, the first component is the propeller shaft 9 which rotates, and the second component is the housing 10 of the transmission 8. The rotation position of the housing 10 is fixed (not rotating) and known. This means that it is sufficient to measure the rotation position of the sleeve 13 to determine the relative rotation position of the first component and the second component. However, although not further described herein, in another application the transmission could comprise one or more sensors. For example, a first sensor for measuring an angular position of the first component and a second sensor for measuring an angular position of the second component.

The magnetic sensor 60 is suitably arranged at a fixed point, preferably attached to the housing of the transmission by means of any suitable attachment means.

Figure 4B:
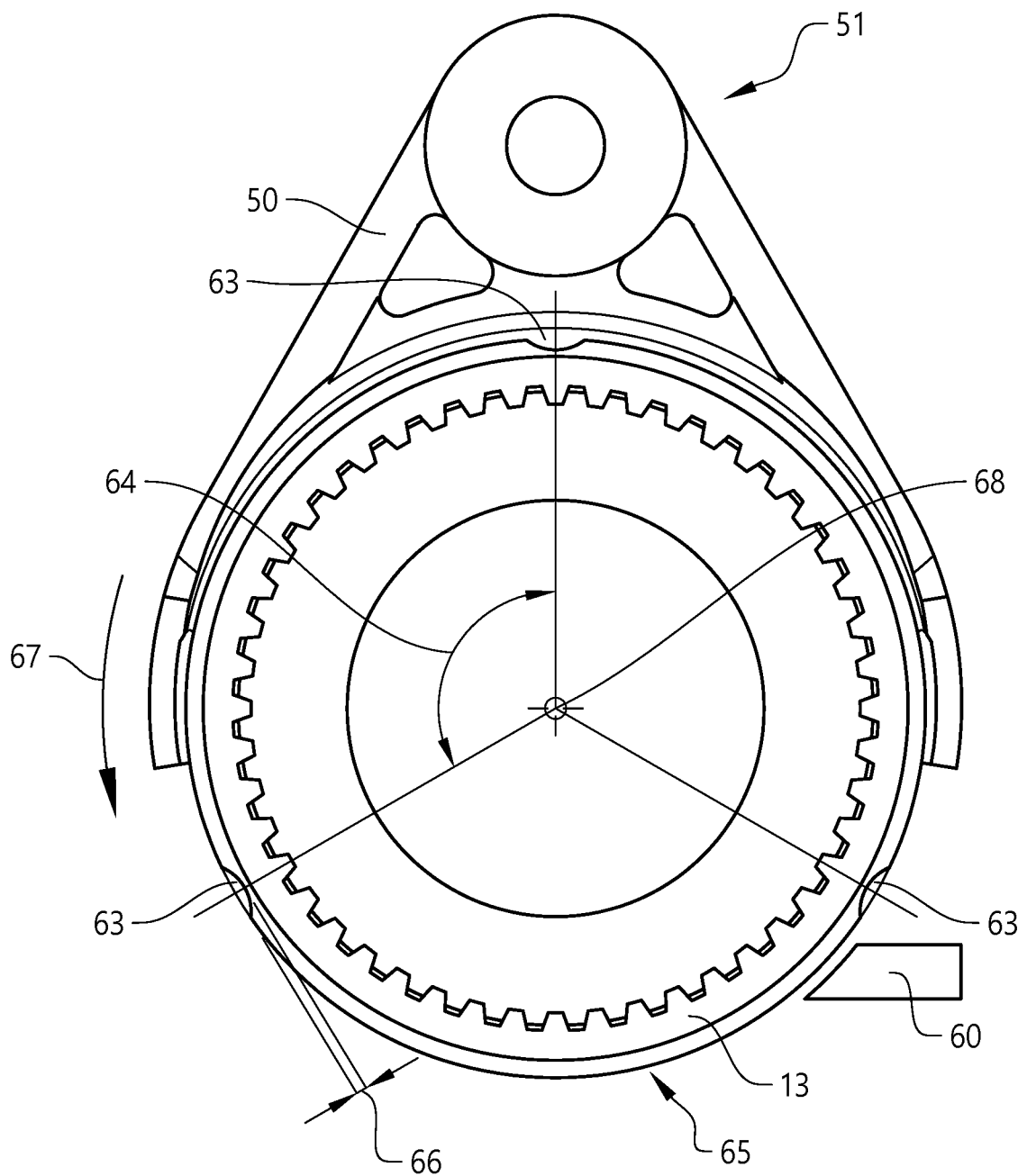
FIG. 4B is a side view of the locking mechanism in FIG. 4A, FIGS. 5A and 5B show interaction between a magnetic field and a sleeve of the locking mechanism.

As shown in the side view in FIG. 4B, the sleeve 13 can have at least one recess 63 for interacting with a magnetic field generated by the magnetic field sensor 60. The recess 63 can be arranged for indicating a rotation position of one of the first component and the second component. Here the recess 63 is arranged for measuring the rotation position of the sleeve 13 and thereby the rotation position of the first component 9. By knowledge of the position of the recess relative to the first component, the relative position of the first component and the second component can be measured by the magnetic field sensor 60.

As further illustrated in FIG. 4B, there are three such recesses 63 indicating possible rotation positions of the sleeve 13 for engagement with the dog ring 14 such that the first component 9 and the second component 10 can be locked relative to each other in the predetermined mutual rotation position. The angle 64 between two adjacent recesses 63 is 120°. These three recess positions correspond to the three equivalent propeller positions previously described and illustrated hereinabove.

Each recess 63 is arranged on an outer surface 65 of the sleeve 13 and the depth 66 of the recess 63 varies along a circumferential direction 67 of the sleeve 13. Thus, the radial distance from the centre 68 of the sleeve 13 to the outer periphery thereof varies along the circumferential of the sleeve 13. This means that the signal from the magnetic field sensor 60 will vary along the circumferential of the sleeve, i.e. vary when the sleeve rotates about the axis 61.

Figure 5A:
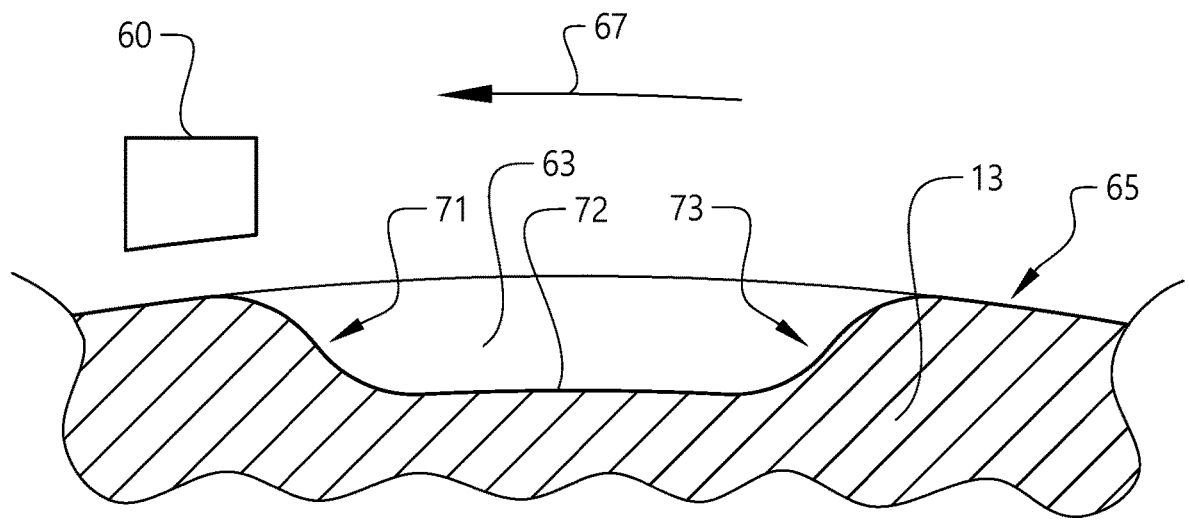
Figure 5B:
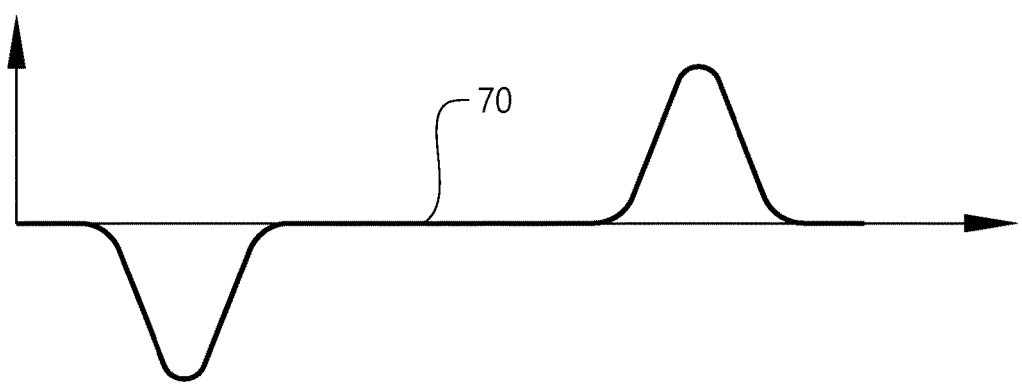

FIGS. 5A and 5B show the interaction of a magnetic field generated by the magnetic field senor 60 and the sleeve 13 when the sleeve is rotating. In FIG. 5A a part of the sleeve 13 is schematically illustrated. The sleeve 13 has an outer periphery 65 and a recess 63 that passes the magnetic field sensor 60 when the sleeve is rotating. In in FIG. 5A, also the magnetic field sensor 60 is schematically illustrated. When the sleeve is rotating (and the sensor is fixed) the distance between the sensor 60 and the sleeve 13 will vary due to the recess 63. The signals provided by the magnetic field sensor 60 is in turn dependent on the distance between the sleeve 13 and the magnetic field sensor 60, and thus dependent on the rotation position of the sleeve as well.

In FIG. 5B the signal 70 from the magnetic field sensor 60 is illustrated. The signal 70 is represented by the change of the disturbance of the magnetic field caused by the sleeve 13. In other words; the signal is based on the derivative of the magnetic field disturbance. Since the distance between the sleeve 13 and the magnetic field sensor 60 is constant during the first part (on the left side in FIG. 5A) when the sleeve 13 is rotated (counterclockwise in the example), the signal is constant during a first part. Thereafter the distance increases along a first slope 71 of the recess 63 until the magnetic field sensor 60 faces a flat bottom 72 of the recess 63. Thus, along the first slope 71 the signal indicates a negative derivative, and along the flat bottom 72 the signal is constant. Thereafter the distance decreases along a second slope 73 of the recess 63 until the magnetic field sensor 60 and the recess 63 have passed each other. Thus, along the second slope 73 the signal indicates a positive derivative. After the recess 63 the signal is constant again since there is no change of the distance between the sleeve 13 and the magnetic field sensor 60. This signal generated by the magnetic field sensor 60 can then be used for determining the current rotation position of the sleeve 13.

Figure 6A:
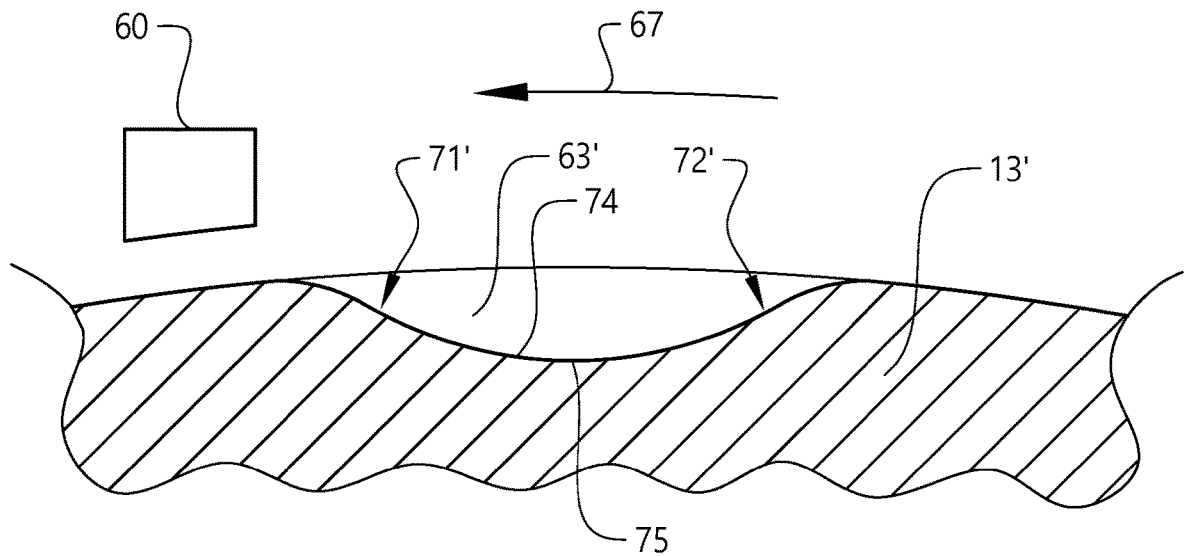
FIGS. 6A and 6B show interaction between a magnetic field and a variant of a sleeve of the locking mechanism.
Figure 6B:
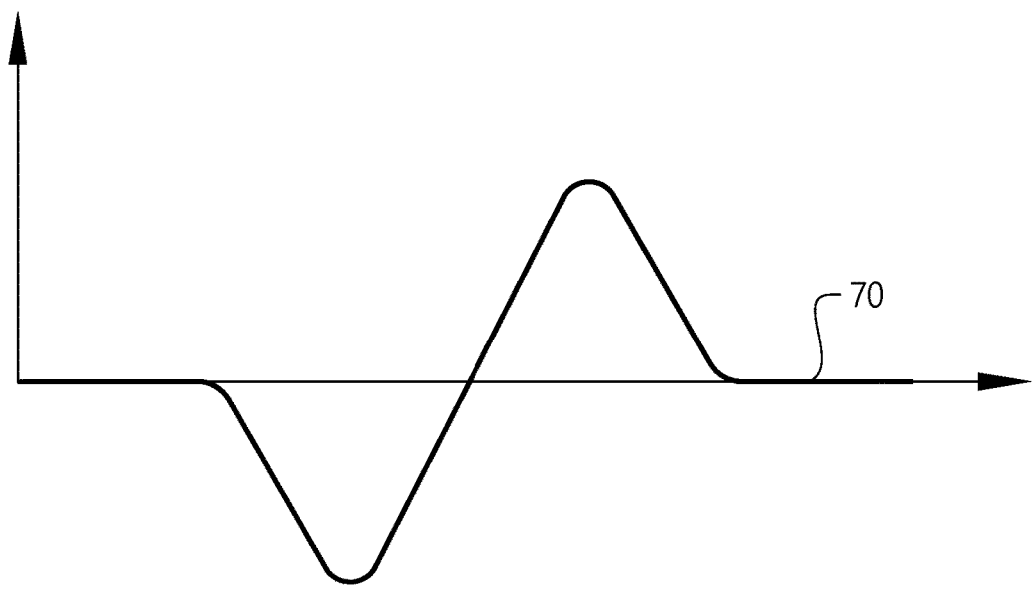

FIGS. 6A and 6B show the interaction of a magnetic field generated by the magnetic field senor 60 and a variant of the sleeve 13' when the sleeve is rotating. In FIG. 6A the sleeve 13' has a recess 63' without a flat bottom portion. Instead a curved bottom portion 74 forms a smooth transition between a first slope 71' and a second slope 73' of the recess 63' of the sleeve 13'. Accordingly, the signal 70' is somewhat different from the signal in FIG. 5B as can be seen in FIG. 6B. From the start of the first slope 71' until the magnetic field sensor 60 faces a bottom point 75 of the recess (which also can be a centre point of the recess) where the distance between the sleeve 13' and the magnetic field senor 60 is greatest, the signal indicates a negative derivative. From the bottom point 75 to the end of the second slope 73' the signal indicates a positive derivative. Before and after the recess 63', the signal is constant in the same way as already described with reference to FIGS. 5A and 5B. Since the derivative changes characters at the bottom point 75 a very precise rotation position of the sleeve 13' can be achieved.

Figure 7A:
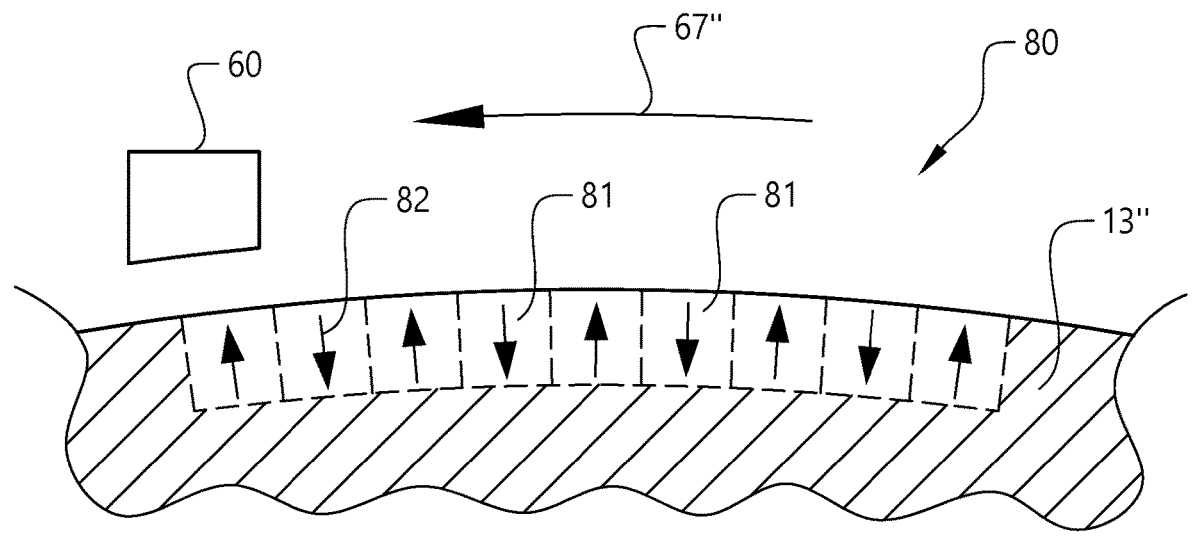
FIGS. 7A and 7B are schematical side views of further sleeve variants of the locking mechanism.
Figure 7B:
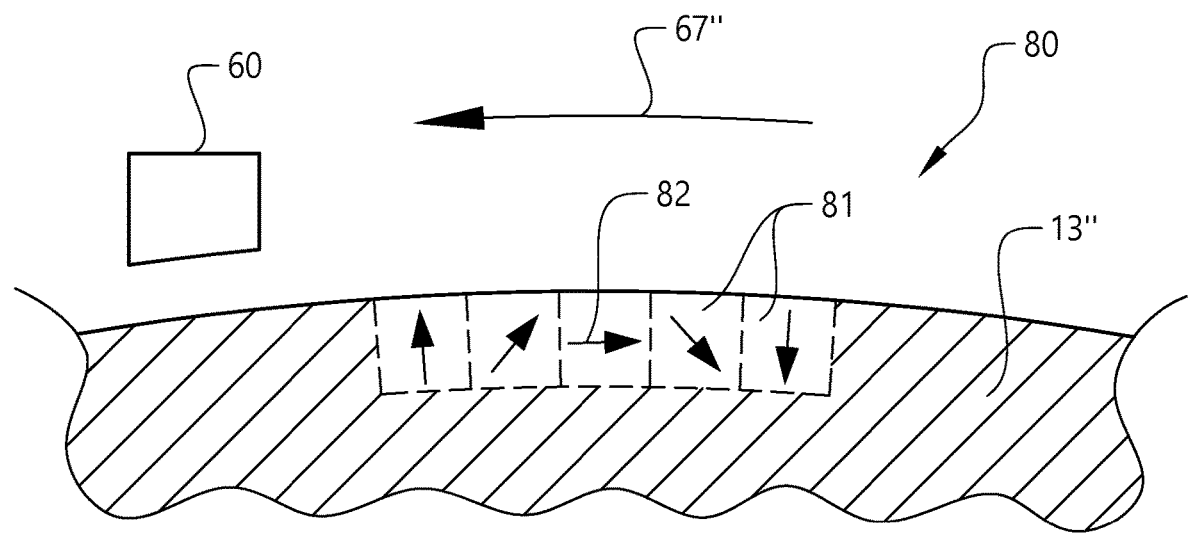

FIGS. 7A and 7B show further variants of a sleeve 13" provided with at least one magnetized portion 80 for interacting with the magnetic field sensor. The sleeve is schematically shown in side views. Instead of a recess said at least one magnetized portion 80 is arranged for indicating the rotation position of the sleeve and thereby the rotation position of the first component. By knowledge of the position of the magnetized portion 80 relative to the first component 9, the relative position of the first component 9 and the second component 10 can be measured by the magnetic field sensor 60.

The sleeve can have one or more such magnetized portions 80, each providing a magnetic field. The magnetized portion 80 can be arranged such that the magnetic field of the magnetized portion varies along a circumferential direction 67" of the lock unit 13". Each such magnetized portion 80 can in turn be divided into two or more sections 81 with different magnetic polarity. The polarity of the sections 81 can be different from each other such that the magnetic field varies along the circumferential direction 67" of the sleeve 13". For example, as illustrated in FIG. 7A, the sections 81 can be arranged with alternating polarity as indicated by the arrows 82. As illustrated in FIG. 7B, a magnetization of the sleeve 13" where the magnetic field varies gradually along the magnetized portion 80 can also be used. Such magnetization can be achieved by magnets arranged in a suitable Halbach array for instance.

The sleeve 13" can be made in one piece or the sleeve may comprise a first ring with the splines and second magnetized ring that is clamped onto the outer surface of the first ring such that the first ring and the second ring sleeve are rotationally locked relative to each other.

As schematically illustrated in FIG. 4A, for performing the method as described herein, a control unit 90 for controlling the gear actuator 51 is provided. The control unit 90 is configured to continuously receive input data 91 from the magnetic field sensor 60. The control unit 90 is further configured to provide output data 92 based on the received input data 91 for controlling the gear actuator 51. The control unit 90 can be electrically connected to the gear actuator 51 for transferring signals between the control unit 90 and a drive unit 93 of the gear actuator 51.

The control unit 90 may comprise one or more microprocessors and/or one or more memory devices or any other components for executing computer programs to perform the method. Thus, the control unit is preferably provided with a computer program for performing all steps of any embodiment of the method described herein. Furthermore, the control unit can be part of a controller used also for other functions of the gear actuator or any other function of the transmission or be provided as a separate unit connectable to a controller.

The invention also relates to a method for locking a first component and a second component relative to each other in a transmission. As previously described, the first component 9 and the second component 10 of the transmission 8 are journaled for rotation relative to each other and the transmission comprising a locking mechanism 12 for rotationally locking the first component and the second component relative to each other in a predetermined mutual rotation position. As it regards further device features, reference is made to the description of the transmission 8 hereinabove.

The method comprises the step of measuring a relative rotation position of the first component 9 and the second component 10 by means of a magnetic field sensor 60 while the first component and the second component are rotating relative to each other, and activating the locking mechanism 12 for rotationally locking the first component 9 and the second component 10 relative to each other in the predetermined mutual rotation position based on the relative rotation position measured by means of the magnetic field sensor 60.

Figure 8:
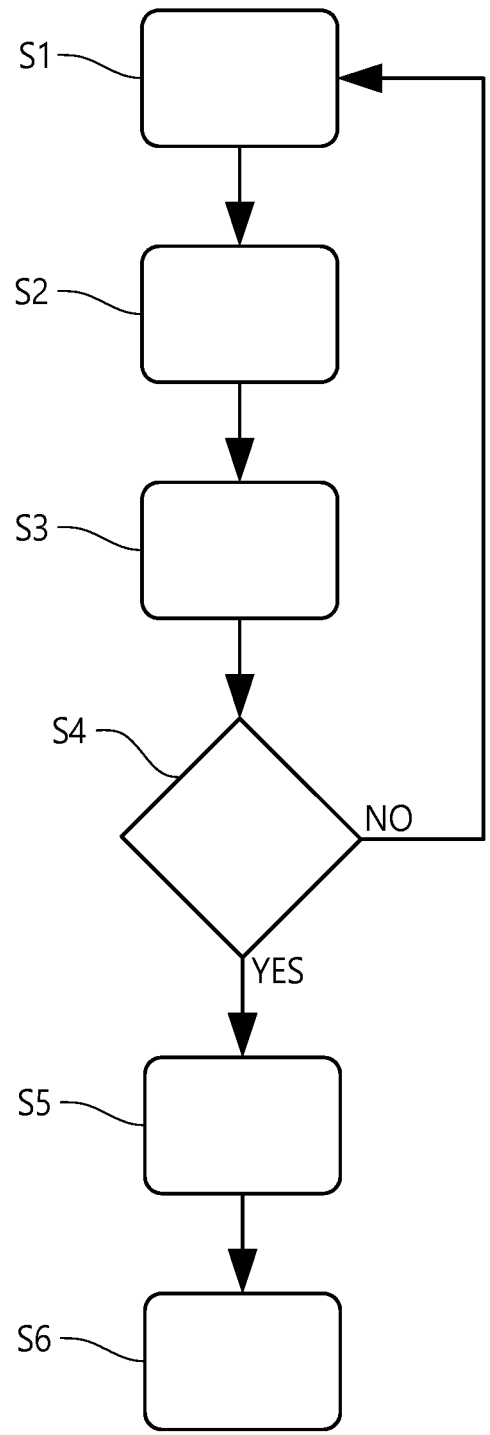
FIG. 8 is a flow chart showing an example embodiment of a method.

FIG. 8 shows a flow chart of one example embodiment of the method. In a first step S1, signals from the magnetic field sensor 60 are transferred to the control unit 90. See also FIG.

4A. The control unit 90 continuously reads the signals originating from measurements on the sleeve 13 performed by the magnetic field sensor 60. In a second step S2 the axial position of the sleeve is detected based on the signals received from the magnetic field sensor 60. In a third step S3 the rotation speed of the sleeve is detected based on the signals received from the magnetic field sensor 60. In a fourth step S4, the detected rotation speed is compared to a target speed interval.

If the measured speed is within the target speed interval ("YES" in FIG. 7), then in a fifth step S5 the rotation position of the sleeve is continuously detected to find a rotation position of the sleeve where engagement of the sleeve and the dog ring can be performed. Should the rotation speed be out of the target speed interval ("NO" in FIG. 7), reading of sensor signals continues until the speed has reached a value within the interval. Preferably, the interval will include speeds from 0 up to an upper threshold value, above which engagement of the sleeve is not possible.

In a sixth step S6, when the speed is in the target speed interval and a rotation position of the sleeve 13 suitable for engagement has been detected, the sleeve 13 is displaced by the gear actuator 51 for engagement of the sleeve 13 and the dog ring 14. As previously described, the relative rotation position of the sleeve 13 and the dog ring 14 is selected such that the first component 9 and the second component 10 are locked relative to each other in the predetermined mutual rotation position.

It is to be understood that the present invention is not limited to the embodiments described above and illustrated in the drawings; rather, the skilled person will recognize that many changes and modifications may be made within the scope of the appended claims.

What is claimed is:

1. A transmission comprising:
    a first component and a second component which are journaled for rotation relative to each other, the second component configured to be rotationally fixed relative to a vehicle,
    a locking mechanism for rotationally locking the first component and the second component relative to each other in a predetermined mutual rotation position such that the first and second components are rotationally fixed; and
    a magnetic field sensor arranged for measuring a relative rotation position of the first component and the second component while the first component and the second component are rotating relative to each other.

2. A transmission according to claim 1, wherein the locking mechanism comprises a lock unit displaceable in an axial direction for engagement of the first component and the second component.

3. A transmission according to claim 2, wherein the lock unit is arranged on the first component.

4. A transmission according to claim 2, wherein the lock unit is a sleeve.

5. A transmission according to claim 2, wherein the lock unit has at least one recess for interacting with a magnetic field generated by the magnetic field sensor, said at least one recess being arranged for indicating a rotation position of one of the first component and the second component.

6. A transmission according to claim 5, wherein said at least one recess is arranged on an outer surface of the lock unit, the depth of the recess varying along a circumferential direction of the lock unit.

7. A transmission according to claim 2, wherein the lock unit is provided with at least one magnetized portion for interacting with the magnetic field sensor, said at least one magnetized portion being arranged for indicating the rotation position of one of the first component and the second component.

8. A transmission according to claim 7, wherein said at least one magnetized portion is arranged such that the magnetic field of the magnetized portion varying along a circumferential direction of the lock unit.

9. A transmission according to claim 1, wherein the first component is a propeller shaft.

10. A transmission according to claim 9, wherein the predetermined mutual rotation position of the first component and the second component corresponds to a predetermined rotation position of a propeller arranged on the propeller shaft.

11. A transmission according to claim 1, wherein the second component is a housing of the transmission.

12. A transmission according to claim 1, wherein the transmission has at least two modes selectable by the locking mechanism, a first stationary mode where the first component and the second component being locked relative to each other in the predetermined mutual rotation position and a second driving mode where the first component is configured to connect to a drive motor for rotating the first component relative to the second component.

13. A roadable aircraft comprising a transmission according to claim 1.

14. A roadable aircraft according to claim 13, wherein the first component is a propeller shaft and the predetermined mutual rotation position of the first component and the second component corresponds to a predetermined rotation position of a propeller arranged on the propeller shaft.

15. A method for locking a first component and a second component relative to each other in a transmission, the first component and the second component of the transmission being journaled for rotation relative to each other and the second component being configured to be rotationally fixed relative to a vehicle, and the transmission comprising a locking mechanism for rotationally locking the first component and the second component relative to each other in a predetermined mutual rotation position, the method comprising:
    measuring a relative rotation position of the first component and the second component by means of a magnetic field sensor while the first component and the second component are rotating relative to each other; and
    activating the locking mechanism for rotationally locking the first component and the second component relative to each other such that the first and second components are rotationally fixed in the predetermined mutual rotation position based on the relative rotation position measured by means of the magnetic field sensor.

16. A transmission comprising:
    a first component and a second component which are journaled for rotation relative to each other; and
    a locking mechanism for rotationally locking the first component and the second component relative to each other in a predetermined mutual rotation position, the locking mechanism comprising a lock unit displaceable in an axial direction for engagement of the first component and the second component; and
    a magnetic field sensor arranged for measuring a relative rotation position of the first component and the second component while the first component and the second component are rotating relative to each other,
    wherein the lock unit is provided with at least one magnetized portion for interacting with the magnetic field sensor, said at least one magnetized portion being arranged for indicating the rotation position of one of the first component and the second component.

17. A transmission according to claim 16, wherein the lock unit is arranged on the first component.

18. A transmission comprising:
a propeller shaft and a second component which are journaled for rotation relative to each other; and
a locking mechanism for rotationally locking the propeller shaft and the second component relative to each other in a predetermined mutual rotation position, wherein the transmission comprises a magnetic field sensor arranged for measuring a relative rotation position of the propeller shaft and the second component while the propeller shaft and the second component are rotating relative to each other,
wherein the predetermined mutual rotation position of the propeller shaft and the second component corresponds to a predetermined rotation position of a propeller arranged on the propeller shaft.

19. A transmission according to claim 18, wherein the second component is a housing of the transmission.

20. A transmission according to claim 18, wherein the locking mechanism comprises a lock unit displaceable in an axial direction for engagement of the first component and the second component.

* * * * *